United States Patent
Nakabayashi et al.

(10) Patent No.: US 12,324,370 B2
(45) Date of Patent: Jun. 10, 2025

(54) HARVESTER, SURROUNDING CONDITION DETECTION SYSTEM, SURROUNDING CONDITION DETECTION PROGRAM, RECORDING MEDIUM RECORDING THE SURROUNDING CONDITION DETECTION PROGRAM AND SURROUNDING CONDITION DETECTION METHOD

(71) Applicant: Kubota Corporation, Osaka (JP)

(72) Inventors: Takashi Nakabayashi, Sakai (JP); Tomohiko Sano, Amagasaki (JP); Osamu Yoshida, Amagasaki (JP); Kazuo Sakaguchi, Amagasaki (JP)

(73) Assignee: Kubota Corporation, Osaka (JP)

( * ) Notice: Subject to any disclaimer, the term of this patent is extended or adjusted under 35 U.S.C. 154(b) by 858 days.

(21) Appl. No.: 17/269,747

(22) PCT Filed: May 21, 2019

(86) PCT No.: PCT/JP2019/020075
§ 371 (c)(1),
(2) Date: Feb. 19, 2021

(87) PCT Pub. No.: WO2020/039671
PCT Pub. Date: Feb. 27, 2020

(65) Prior Publication Data
US 2021/0169002 A1 Jun. 10, 2021

(30) Foreign Application Priority Data
Aug. 20, 2018 (JP) .................................. 2018-154142

(51) Int. Cl.
*A01D 41/127* (2006.01)
*A01B 69/00* (2006.01)
*G05D 1/00* (2024.01)

(52) U.S. Cl.
CPC ............ *A01D 41/127* (2013.01); *A01B 69/00* (2013.01); *G05D 1/021* (2013.01)

(58) Field of Classification Search
CPC .............. A01D 41/127; A01D 41/1278; A01D 41/00–41/16; A01B 69/008;
(Continued)

(56) References Cited

U.S. PATENT DOCUMENTS 8,909,389 B2 12/2014 Meyer
9,841,768 B2 12/2017 Hiramatsu et al.
(Continued)

FOREIGN PATENT DOCUMENTS

| | | |
|---|---|---|
| CN | 105814404 A | 7/2016 |
| CN | 106164801 A | 11/2016 |
| JP | 2015191592 A | 11/2015 |

*Primary Examiner* — Mohamed Abdo Algehaim
(74) *Attorney, Agent, or Firm* — The Webb Law Firm

(57) ABSTRACT

A harvester configured to harvest crops while traveling in a field includes a self-machine position detection module included in a machine body and operable to detect a self-machine position, a detection unit included in the machine body and including detection modules capable of detecting conditions of surrounding of the machine body, a map creation section operable to create, based on the self-machine position, a map indicative of a position of a reaped land in the field where the crops have been reaped and a position of an un-reaped land in the field where the crops have not yet been reaped and an operational mode setting section setting operational modes of the detection modules respectively, based on the map and the self-machine position.

12 Claims, 5 Drawing Sheets

(58) Field of Classification Search
CPC ... A01B 69/00–69/12; B60Y 2200/222; G05D 1/021; G05D 2201/0201; G05D 1/0274; G05D 1/02; G05D 1/0219
USPC .......................................................... 701/50
See application file for complete search history.

(56) References Cited

U.S. PATENT DOCUMENTS

| | | | | |
|---|---|---|---|---|
| 11,234,357 | B2* | 2/2022 | Schoeny | A01B 79/005 |
| 2015/0253427 | A1* | 9/2015 | Slichter | G01S 7/4808 356/5.01 |
| 2015/0271989 | A1* | 10/2015 | Kinch | A01C 21/005 701/50 |
| 2015/0305238 | A1* | 10/2015 | Klausmann | A01D 75/00 701/50 |
| 2017/0079195 | A1* | 3/2017 | Yokoyama | B60W 10/18 |
| 2017/0082442 | A1* | 3/2017 | Anderson | G01C 21/20 |
| 2017/0102702 | A1* | 4/2017 | Ishijima | G05D 1/0219 |
| 2017/0131718 | A1* | 5/2017 | Matsumura | G05D 1/02 |
| 2017/0131722 | A1* | 5/2017 | Hiramatsu | G05D 1/0238 |
| 2017/0280614 | A1* | 10/2017 | Turpin | G06Q 10/0633 |
| 2018/0176735 | A1 | 6/2018 | Schuller et al. | |
| 2018/0183998 | A1* | 6/2018 | Menachem | G06T 3/40 |
| 2018/0325012 | A1* | 11/2018 | Ferrari | A01B 69/008 |
| 2019/0102623 | A1* | 4/2019 | Flood | G08G 5/0039 |
| 2019/0343036 | A1* | 11/2019 | Prankl | G07C 5/008 |
| 2020/0015416 | A1* | 1/2020 | Barther | H04N 7/183 |
| 2020/0031270 | A1* | 1/2020 | Beschorn | F21V 23/0442 |
| 2020/0053962 | A1* | 2/2020 | Dix | A01D 41/1278 |
| 2020/0068804 | A1* | 3/2020 | Barther | G06T 7/74 |
| 2020/0084963 | A1* | 3/2020 | Gururajan | A01D 41/127 |
| 2020/0333782 | A1* | 10/2020 | Kent | G05D 1/0027 |
| 2020/0363811 | A1* | 11/2020 | Nishii | G01C 21/20 |
| 2020/0409371 | A1* | 12/2020 | Ueda | G05D 1/0212 |
| 2021/0100156 | A1* | 4/2021 | Iwase | G01S 7/497 |
| 2022/0142033 | A1* | 5/2022 | Ferrari | H04N 7/181 |
| 2022/0167547 | A1* | 6/2022 | Vandike | A01G 25/167 |
| 2023/0306338 | A1* | 9/2023 | Hunsaker | G08G 1/205 701/50 |

* cited by examiner

HARVESTER, SURROUNDING CONDITION DETECTION SYSTEM, SURROUNDING CONDITION DETECTION PROGRAM, RECORDING MEDIUM RECORDING THE SURROUNDING CONDITION DETECTION PROGRAM AND SURROUNDING CONDITION DETECTION METHOD

CROSS-REFERENCE TO RELATED APPLICATIONS

This application is the United States national phase of International Application No. PCT/JP2019/020075 filed May 21, 2019, and claims priority to Japanese Patent Application No. 2018-154142 filed Aug. 20, 2018, the disclosures of which are hereby incorporated by reference in their entirety.

BACKGROUND OF THE INVENTION

Technical Field

The present invention relates to a harvester harvesting crops while traveling in a field. The invention relates also to a surrounding condition detection system for detecting conditions of surrounding of such harvester, a surrounding condition detection program for detecting conditions of surrounding of such harvester, a recording medium recording such surrounding condition detection program and a surrounding condition detection method for detecting conditions of the surrounding of the harvester.

Description of Related Art

Conventionally, a harvester such as a combine has been employed for harvesting crops. As an example of such type of combine, there is one configured to carry out a harvesting work by automated (autonomous) traveling in order to improve the harvesting efficiency (for example, Patent Document 1).

Patent Document 1 discloses an autonomous traveling work vehicle including a position calculating means for determining a position of the machine body with utilizing a satellite positioning system and a controlling means for causing the vehicle to effect traveling and a utility work autonomously along a set traveling route. Further, this autonomous traveling work vehicle includes an obstacle detecting means for detecting an obstacle if any in the surrounding, and a sensitivity adjusting means for varying sensitivity of the obstacle detecting means. The sensitivity of the obstacle detecting means is set high within a field, whereas the sensitivity of the obstacle detecting means is set low outside the field. Moreover, the sensitivity is set such that a larger detection range may be provided at the center portion within the field whereas the detection range becomes progressively smaller as the vehicle approaches the outer circumference of the field.

PATENT DOCUMENT

Patent Document 1: Japanese Unexamined Patent Application Publication No. 2015-191592

SUMMARY OF THE INVENTION

A harvester may travel not only in an un-reaped (un-worked) land in a field where harvesting work has not been done, but also in a reaped land (worked land) where harvesting work has been done. As a subject (a target) to be detected will differ between such un-reaped land and reaped land as above, it is not readily possible to appropriately detect the detection subject by merely varying the sensitivity between the inside of the field and the outside of the field, or further varying between the center portion of the field and the outer circumference portion of the field, as provided by the technique disclosed in Patent Document 1.

Thus, there is a need for a technique that allows an automated traveling with appropriate detection of a detection object within a field.

According to a characterizing feature of a harvester relating to the present invention, a harvester configured to harvest crops while traveling in a field, comprises:

a self-machine (self-vehicle) position detection module included in a machine body and operable to detect a self-machine position;

a detection unit included in the machine body and including a plurality of detection modules capable of detecting conditions of surrounding of the machine body;

a map creation section operable to create, based on the self-machine position, a map indicative of a position of a reaped land in the field where the crops have been reaped and a position of an un-reaped land in the field where the crops have not yet been reaped; and an operational mode setting section for setting operational modes of the plurality of detection modules respectively, based on the map and the self-machine position.

With the above-described characterizing feature, the operational mode setting section can set operational modes of the detection modules provided in the circumference of the machine body in accordance with the position on the map of the field, so that the detection module can detect an object (a target) appropriately within the field. For this reason, according to the inventive characterizing feature, it is possible to realize a combine that can effect an automated traveling with using detection results obtained by the detection modules.

Further, preferably, the operational mode setting section is configured to stop a detection function of a particular detection module among the plurality of detection modules, based on the map and the self-machine position, the particular detection module being directed to detection of the condition of the un-reaped land.

With the above-described arrangement, an erroneous detection can be prevented by disabling a detection module which may detect the crops.

Further, preferably, the operational mode setting section is configured to set detection ranges of the plurality of detection modules, based on the map and the self-machine position.

With the above-described arrangement, it becomes possible e.g. to distribute the detection range among the respective plural of detection modules. In such case, since the loads of the detection modules can be divided, it is possible to prevent detection delay and/or an erroneous detection.

Further, preferably, machine body works effected by the machine body include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and at the time of the turning harvesting work and at the time of the turning traveling, the operational mode setting section sets higher detection sensitivity for the lateral sides of the machine body than those for the front side and the rear side with respect to an advancing direction of the machine body.

With the above-described arrangement, during turning of the machine body, fucus of object detection can be given to the lateral side. Therefore, it is possible to prevent erroneous entrapment of an object present on the inner side of the turning at the time of turning of the machine body as well as accidental contact with an object present at an outer terminal end of foregoing turn.

Further, preferably,
at the time of traveling in the un-reaped land in the field, the operational mode setting section sets higher sensitivity for the reaped land located laterally of the machine body than for the reaped land located rearwardly of the machine body; and
at the time of traveling in the reaped land in the field, the operational mode setting section sets higher sensitivity for the reaped land located forwardly of the machine body than for the reaped land located laterally of the machine body.

With the above-described arrangement, detection of an object present in the forwardly located reaped land within the field is made easy, thus effectively preventing erroneous detection due to detection of the un-reaped land.

And, according to a characterizing feature of a surrounding condition detection system relating to the present invention, a surrounding condition detection system for a harvester configured to harvest crops while traveling in a field, the system comprising:
a self-machine position detection module operable to detect a self-machine position of the harvester;
a detection unit including a plurality of detection modules capable of detecting conditions of surrounding of the harvester;
a map creation section operable to create, based on the self-machine position, a map indicative of a position of a reaped land in the field where the crops have been reaped and a position of an un-reaped land in the field where the crops have not yet been reaped; and
an operational mode setting section for setting operational modes of the plurality of detection modules respectively, based on the map and the self-machine position.

With the above-described surrounding condition detection system too, as there is no substantial difference from the above-described harvester, substantially same advantageous effect as the harvester can be achieved.

Further, preferably, the operational mode setting section is configured to stop a detection function of a particular detection module among the plurality of detection modules, based on the map and the self-machine position, the particular detection module being assigned for detection of the conditions of the un-reaped land.

With the above-described arrangement, an erroneous detection can be prevented by disabling a detection module which may detect the crops.

Further, preferably, the operational mode setting section is configured to set detection ranges of the plurality of detection modules, based on the map and the self-machine position.

With the above-described arrangement, it becomes possible e.g. to distribute the detection range among the respective plural of detection modules. In such case, since the loads of the detection modules can be divided, it is possible to prevent detection delay and/or an erroneous detection.

Further, preferably, machine body works effected by the machine body of the harvester include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and
at the time of the turning harvesting work and at the time of the turning traveling, the operational mode setting section sets higher detection sensitivity for the lateral sides of the machine body than those for the front side and the rear side with respect to an advancing direction of the machine body.

With the above-described arrangement, during turning of the machine body, fucus of object detection can be given to the lateral side. Therefore, it is possible to prevent erroneous entrapment of an object present on the inner side of the turning at the time of turning of the machine body as well as accidental contact with an object present at an outer terminal end of foregoing turn.

Further, preferably,
at the time of traveling in the un-reaped land in the field, the operational mode setting section sets higher sensitivity for the reaped land located laterally of the machine body than for the reaped land located rearwardly of the machine body; and
at the time of traveling in the reaped land in the field, the operational mode setting section sets higher sensitivity for the reaped land located forwardly of the machine body than for the reaped land located laterally of the machine body.

With the above-described arrangement, detection of an object present in the forwardly located reaped land within the field is made easy, thus effectively preventing erroneous detection due to detection of the un-reaped land.

And, according to a characterizing feature of a surrounding condition detection program relating to the present invention, a surrounding condition detection program for a harvester configured to harvest crops while traveling in a field, the program causing a computer to execute:
a self-machine position detection function causing a self-machine position detection module to detect a self-machine position of the harvester;
a detection function causing a detection unit including a plurality of detection modules to detect conditions of surrounding of the harvester;
a map creation function creating, based on the self-machine position, a map indicative of a position of a reaped land in the field where the crops have been reaped and a position of an un-reaped land in the field where the crops have not yet been reaped; and
an operational mode setting function setting operational modes of the plurality of detection modules respectively, based on the map and the self-machine position.

By installing such surrounding condition detection program in a computer and causing the computer to execute the program, it is possible to detect conditions of surrounding of a harvester configured to harvest crops while traveling in a field.

Further, preferably, the operational mode setting function is configured to stop a detection function of a particular detection module among the plurality of detection modules, based on the map and the self-machine position, the particular detection module being assigned for detection of the conditions of the un-reaped land.

With the above-described arrangement, an erroneous detection can be prevented by disabling a detection module which may detect the crops.

Further, preferably, the operational mode setting function is configured to set detection ranges of the plurality of detection modules, based on the map and the self-machine position.

With the above-described arrangement, it becomes possible e.g. to distribute the detection range among the respective plural of detection modules. In such case, since the loads of the detection modules can be divided, it is possible to prevent detection delay and/or an erroneous detection.

Further, preferably, machine body works effected by the machine body of the harvester include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and
- at the time of the turning harvesting work and at the time of the turning traveling, the operational mode setting function sets higher detection sensitivity for the lateral sides of the machine body than those for the front side and the rear side with respect to an advancing direction of the machine body.

With the above-described arrangement, during turning of the machine body, fucus of object detection can be given to the lateral side. Therefore, it is possible to prevent erroneous entrapment of an object present on the inner side of the turning at the time of turning of the machine body as well as accidental contact with an object present at an outer terminal end of foregoing turn.

Further, preferably,
- at the time of traveling in the un-reaped land in the field, the operational mode setting function sets higher sensitivity for the reaped land located laterally of the machine body than for the reaped land located rearwardly of the machine body; and
- at the time of traveling in the reaped land in the field, the operational mode setting function sets higher sensitivity for the reaped land located forwardly of the machine body than for the reaped land located laterally of the machine body.

With the above-described arrangement, detection of an object present in the forwardly located reaped land within the field is made easy, thus effectively preventing erroneous detection due to detection of the un-reaped land.

And, according to a characterizing feature of a recording medium relating to the present invention, a recording medium recording therein a surrounding condition detection program for a harvester configured to harvest crops while traveling in a field, the program causing a computer to execute:
- a self-machine position detection function causing a self-machine position detection module to detect a self-machine position of the harvester;
- a detection function causing a detection unit including a plurality of detection modules to detect conditions of surrounding of the harvester;
- a map creation function creating, based on the self-machine position, a map indicative of a position of a reaped land in the field where the crops have been reaped and a position of an un-reaped land in the field where the crops have not yet been reaped; and
- an operational mode setting function setting operational modes of the plurality of detection modules respectively, based on the map and the self-machine position.

By installing a surrounding condition detection program in a computer via the above-described recording medium and causing the computer to execute the program, it is possible to cause the computer to detect the conditions of surrounding of a harvester which harvests crops while traveling in a field.

Further, preferably, the operational mode setting function is configured to stop a detection function of a particular detection module among the plurality of detection modules, based on the map and the self-machine position, the particular detection module being assigned for detection of the conditions of the un-reaped land.

With the above-described arrangement, an erroneous detection can be prevented by disabling a detection module which may detect the crops.

Further, preferably, the operational mode setting function is configured to set detection ranges of the plurality of detection modules, based on the map and the self-machine position.

With the above-described arrangement, it becomes possible e.g. to distribute the detection range among the respective plural of detection modules. In such case, since the loads of the detection modules can be divided, it is possible to prevent detection delay and/or an erroneous detection.

Further, preferably, machine body works effected by the machine body of the harvester include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and
- at the time of the turning harvesting work and at the time of the turning traveling, the operational mode setting function sets higher detection sensitivity for the lateral sides of the machine body than those for the front side and the rear side with respect to an advancing direction of the machine body.

With the above-described arrangement, during turning of the machine body, fucus of object detection can be given to the lateral side. Therefore, it is possible to prevent erroneous entrapment of an object present on the inner side of the turning at the time of turning of the machine body as well as accidental contact with an object present at an outer terminal end of foregoing turn.

Further, preferably,
- at the time of traveling in the un-reaped land in the field, the operational mode setting function sets higher sensitivity for the reaped land located laterally of the machine body than for the reaped land located rearwardly of the machine body; and
- at the time of traveling in the reaped land in the field, the operational mode setting function sets higher sensitivity for the reaped land located forwardly of the machine body than for the reaped land located laterally of the machine body.

With the above-described arrangement, detection of an object present in the forwardly located reaped land within the field is made easy, thus effectively preventing erroneous detection due to detection of the un-reaped land.

And, according to a characterizing feature of a surrounding condition detection method relating to the present invention, a surrounding condition detection method for a harvester configured to harvest crops while traveling in a field, the method comprising:
- a self-machine position detection step causing a self-machine position detection module to detect a self-machine position of the harvester;

a detection step causing a detection unit including a plurality of detection modules to detect conditions of surrounding of the harvester;

a map creation step creating, based on the self-machine position, a map indicative of a position of a reaped land in the field where the crops have been reaped and a position of an un-reaped land in the field where the crops have not yet been reaped; and an operational mode setting step setting operational modes of the plurality of detection modules respectively, based on the map and the self-machine position.

With the above-described surrounding condition detection method too, as there is no substantial difference from the above-described harvester, substantially same advantageous effect as the harvester can be achieved.

Further, preferably, the operational mode setting step is configured to stop a detection function of a particular detection module among the plurality of detection modules, based on the map and the self-machine position, the particular detection module being assigned for detection of the conditions of the un-reaped land.

With the above-described arrangement, an erroneous detection can be prevented by disabling a detection module which may detect the crops.

Further, preferably, the operational mode setting step is configured to set detection ranges of the plurality of detection modules, based on the map and the self-machine position.

With the above-described arrangement, it becomes possible e.g. to distribute the detection range among the respective plural of detection modules. In such case, since the loads of the detection modules can be divided, it is possible to prevent detection delay and/or an erroneous detection.

Further, preferably, machine body works effected by the machine body of the harvester include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and at the time of the turning harvesting work and at the time of the turning traveling, the operational mode setting step sets higher detection sensitivity for the lateral sides of the machine body than those for the front side and the rear side with respect to an advancing direction of the machine body.

With the above-described arrangement, during turning of the machine body, fucus of object detection can be given to the lateral side. Therefore, it is possible to prevent erroneous entrapment of an object present on the inner side of the turning at the time of turning of the machine body as well as accidental contact with an object present at an outer terminal end of foregoing turn.

Further, preferably, at the time of traveling in the un-reaped land in the field, the operational mode setting step sets higher sensitivity for the reaped land located laterally of the machine body than for the reaped land located rearwardly of the machine body; and at the time of traveling in the reaped land in the field, the operational mode setting step sets higher sensitivity for the reaped land located forwardly of the machine body than for the reaped land located laterally of the machine body.

With the above-described arrangement, detection of an object present in the forwardly located reaped land within the field is made easy, thus effectively preventing erroneous detection due to detection of the un-reaped land.

DETAILED DESCRIPTION OF THE INVENTION

A harvester relating to the present invention is configured to detect appropriately conditions of a surrounding (surrounding condition(s)) in the course of harvesting crops while traveling in a field. Next, a harvester 10 of this embodiment will be explained. Incidentally, in the following, a combine 10 will be explained as an example of such harvester 10.

Figure 1:
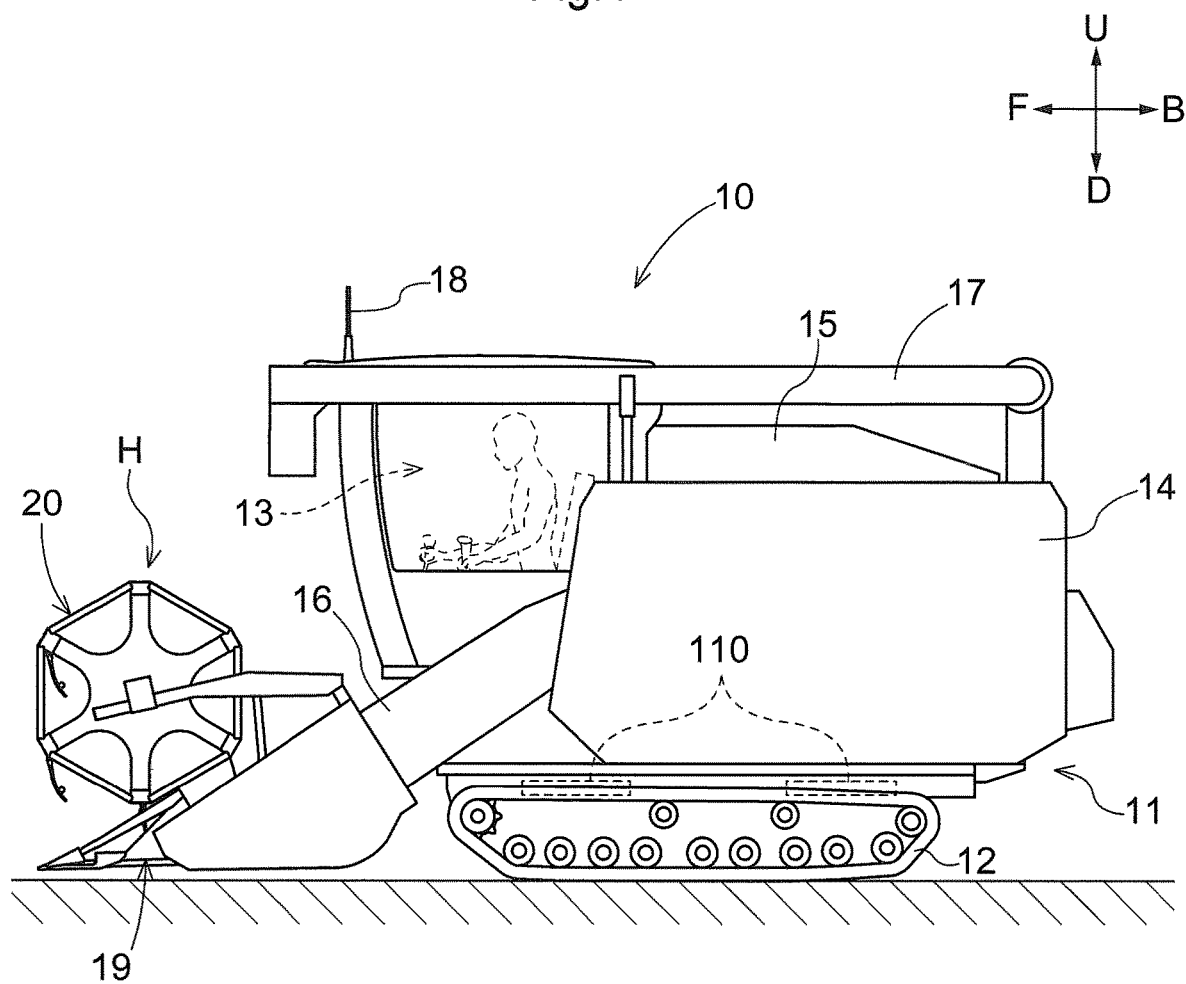
FIG. 1 is a side view of a combine.

FIG. 1 is a side view of the combine 10 of this embodiment. In the following, the combine 10 of this embodiment will be explained with citing a so-called standard type combine as an example thereof. Needless to say, however, the combine 10 may be a self-threshing type combine also.

Here, for the sake of facilitating understanding, in the instant embodiment, unless explicitly indicated otherwise, the term "front" (the direction of arrow F shown in FIG. 1) means the front or forward side with respect to the machine body front/rear direction (traveling direction), and the term "rear" (the direction of arrow B shown in FIG. 1) means the rear or reverse side with respect to the machine body front/rear direction (traveling direction). Further, the left/right direction or the horizontal direction means the machine body transverse direction (machine body width direction) orthogonal to the machine body front/rear direction. Moreover, the term "upper" (the direction of arrow U shown in FIG. 1) and the term "lower" (the direction of arrow D shown in FIG. 1) represent the positional relations with respect to the perpendicular direction (vertical direction) of the machine body, indicative of relations with respect to the ground height or clearance.

As shown in FIG. 1, the combine 10 includes a traveling vehicle body 11, a crawler type traveling device 12, a driving section 13, a threshing device 14, a grain tank 15, a harvesting section H, a conveyer device 16, a grain discharging device 17 and a self-machine position detection module 18.

The traveling device 12 is provided under the traveling vehicle body 11 (an example of "machine body", to be referred to simply as a vehicle body 11 hereinafter). The combine 10 is configured to be capable of self-propelling by means of the traveling device 12. The driving section 13, the threshing device 14 and the grain tank 15 are provided upwardly of the traveling device 12 and together constitute an upper part of the vehicle body 11. In the driving section 13, a driver driving the combine 10 and a monitoring person monitoring a work by the combine 10 can ride. Normally, a driver will act also as a monitoring person. Incidentally, in case the driver and the monitoring person are different persons, the monitoring person may monitor a work of the combine 10 from outside the machine body of the combine 10.

The grain discharging device 17 is coupled to a rear lower portion of the grain tank 15. Further, the self-machine position detection module 18 is attached to a front upper portion of the driving section 13 and detects the self-machine (self-vehicle) position. The self-machine position detection module 18 may employ a global positioning module configured as a GNSS module. This self-machine position detection module 18 includes a satellite antenna for receiving GPS signals and/or GNSS signals (to be collectively referred to as "GPS signals" in this embodiment) from an artificial satellite GS (see FIG. 2). Incidentally, the self-machine position detection module 18 may include an inertial navigation module incorporating a gyro acceleration sensor and a magnetic azimuth sensor for supplementing satellite navigation. Needless to say, the inertial navigation module may alternatively be provided at a site separate from the self-machine position detection module 18. In operation, the self-machine position detection module 18 detects a self-machine (self-vehicle) position which is a position of the combine 10, based on the above-described GPS signals and the detection result of the inertial navigation module. Such self-machine position detected by the self-machine position detection module 18 will be used for the automated traveling (autonomous traveling) of the combine 10 and the respective functional sections to be described later as "self-machine position information".

The harvesting section H is provided at a front portion of the combine 10. The conveyer device 16 is provided rearwardly of the harvesting section H. The harvesting section H includes a cutting mechanism 19 and a reel 20. The cutting mechanism 19 cuts or reaps planted crop stalks in a field. The reel 20, as being rotatably driven, rakes in the planted crop stalks as harvesting targets or objects. With this arrangement, the harvesting section H is capable of harvesting crops (a kind of agricultural produce) in a field. The combine 10 can carry out a work traveling in which the combine 10 travels by the traveling device 12 while harvesting the crops in the field by the harvesting section H.

Reaped crop stalks reaped by the cutting mechanism 19 will be conveyed by the conveying device 16 to the threshing device 14. In this threshing device 14, the reaped cop stalks will be subjected to a threshing treatment. Grains obtained by the threshing treatment will then be reserved in the grain tank 15. The grains reserved in the grain tank 15 will be discharged, when needed, to the outside of the machine by the grain discharging device 17. Incidentally, in this combine 10, between the vehicle body 11 and the traveling device 12, there is provided a hydraulic inclination mechanism 110, which allows inclination of the vehicle body 11 in the left/right direction and the front/rear direction relative to the traveling surface (field surface).

Figure 2:
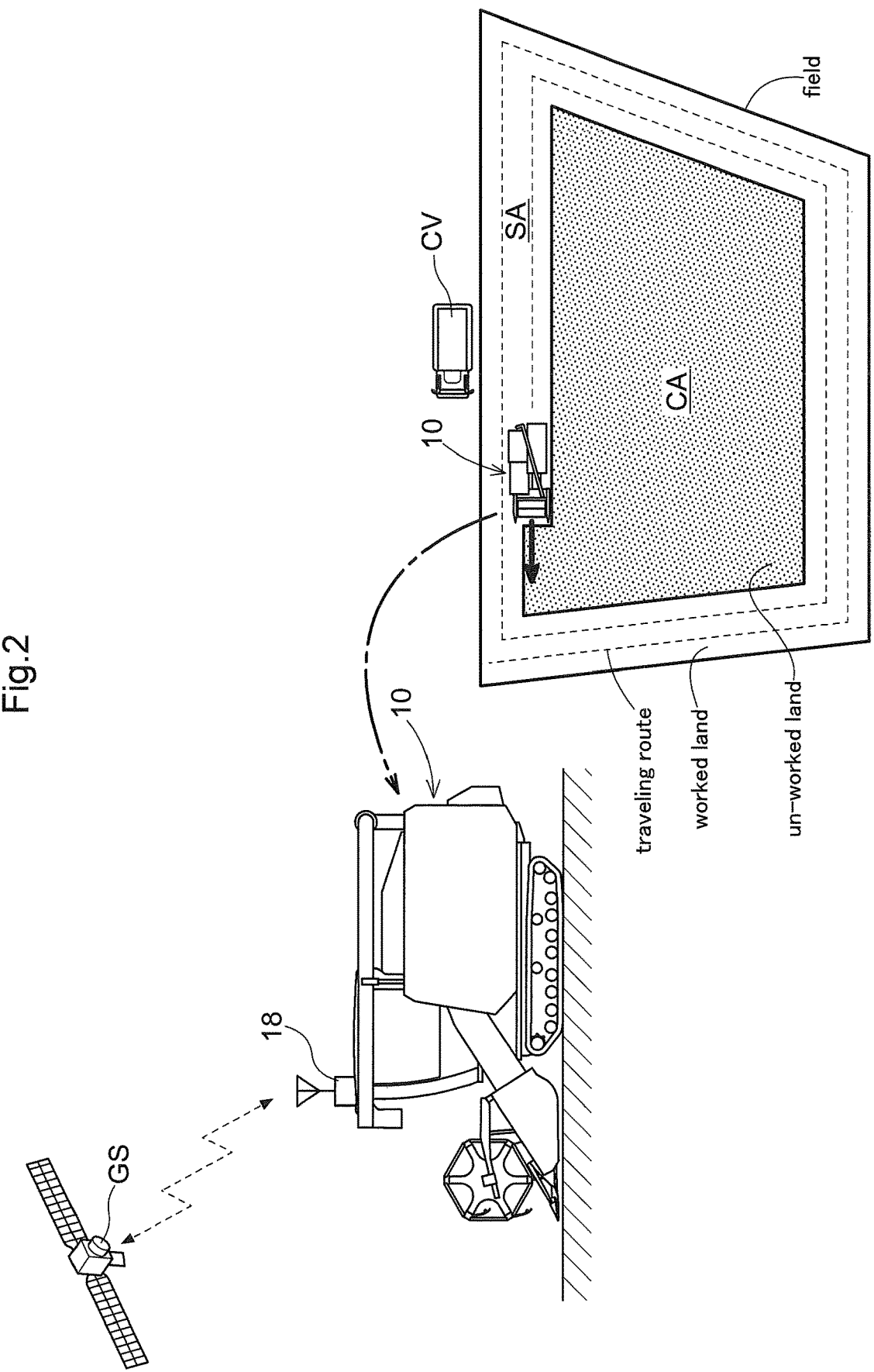
FIG. 2 is a view showing generally an automated traveling of the combine.

FIG. 2 is a view schematically showing the automated traveling of the combine 10. As shown in FIG. 2, the combine 10 effects an automated traveling (autonomous traveling) along a traveling route set in the field. For this automated traveling, the above-described self-machine position information obtained by the self-machine position detection module 18 is utilized.

The combine 10 of this embodiment carries out a harvesting work in a field in accordance with the following procedure.

Firstly, a driving/monitoring person will manually operate the combine 10 and carry out a harvesting work while effecting a circumference reaping work traveling along a borderline of a field in an outer circumferential portion inside the field as shown in FIG. 2. An area formed as a reaping-completed (reaped) area ("worked area") by the circumference reaping traveling will be set as an outer circumference area SA. And, the inner area left as an un-reaped land ("unworked area") on the inner side of the outer circumference area SA will be set as a work subject area CA.

In the above, in order to secure a certain amount of width for the outer circumference area SA, the driver will cause the combine 10 to travel for 2 to 3 laps. With completion of one lap traveling of the combine 10, the width of the outer circumference area SA is increased by the working width of the combine 10. After completion of first two or three laps of traveling, the width of the outer circumference area SA will become about 2 to 3 times the working width of the combine 10. Incidentally, the circumference reaping work traveling is not limited to such 2 to 3 laps of traveling, but may be more (equal to or more than 4 laps) or just one lap as well.

The outer circumference area SA is used as a space allowing the combine 10 to make a turn during harvesting traveling in the work subject area CA. Further, the outer circumference area SA is used also as a space allowing certain movements, such as a movement to a location for discharging grains or a movement to a location of fuel replenishment, after temporary completion of harvesting traveling.

FIG. 2 further shows a transporter vehicle CV which can collect and transport the grains harvested by the combine 10. At the time of grain discharging, the combine 10 will move to the vicinity of the transporter vehicle CV and then discharge the grains to the transporter vehicle CV by the grain discharging device 17.

Figure 3:
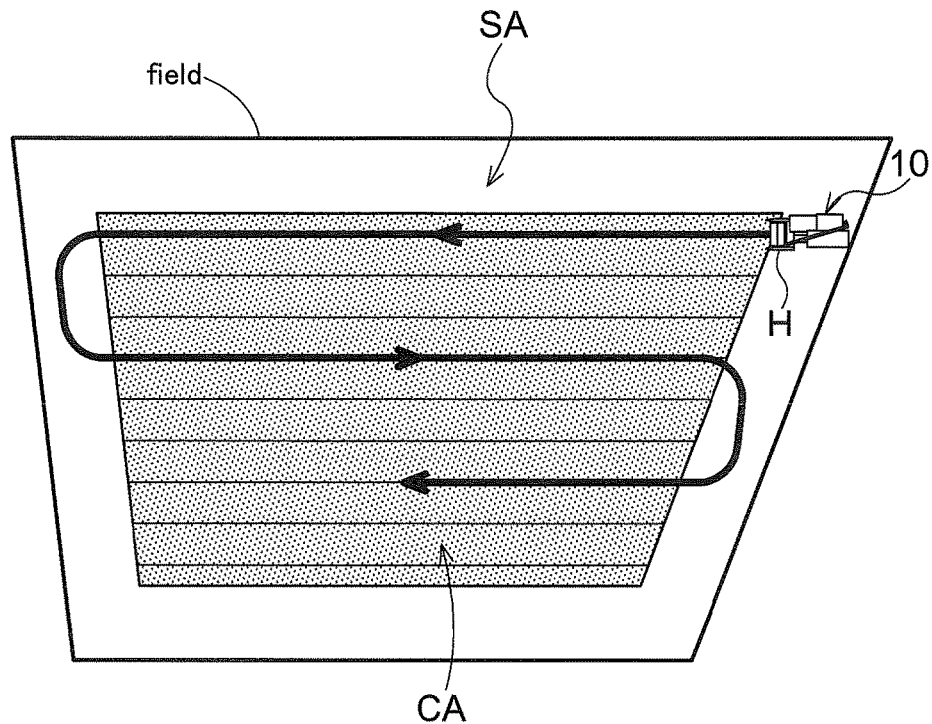
FIG. 3 is a view showing a traveling route in the automated traveling.

Upon setting of the outer circumference area SA and the work subject area CA by the above-described traveling by the manual traveling, traveling routes in the work subject area CA will be calculated, as shown in FIG. 3. The calculated traveling routes will be set one after another based on the pattern of the work traveling and the combine 10 will be controlled for its automated traveling so that it may travel along the set traveling routes.

Figure 4:
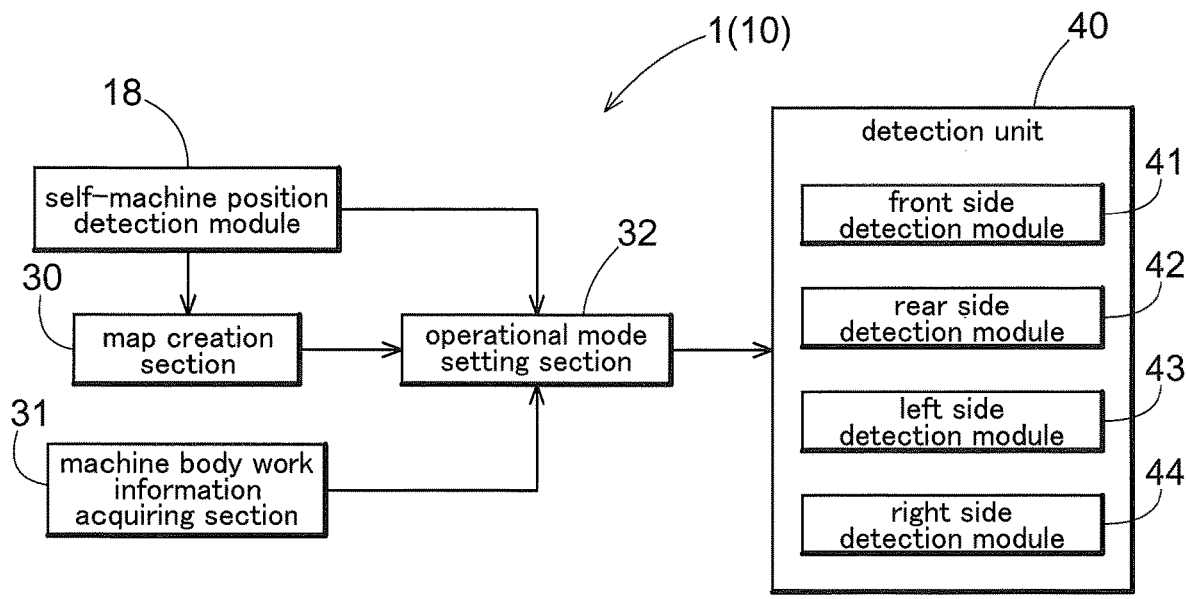
FIG. 4 is a block diagram showing configuration of the combine.

FIG. 4 is a block diagram showing configuration of a detection system (an example of a "surrounding condition detection system") 1 for detecting conditions of surrounding of the combine 10. As shown in FIG. 4, the detection system 1 includes, in addition to the self-machine position detection module 18 described above, respective functional sections consisting of a map creation section 30, a machine body work information acquiring section 31, an operational mode setting section 32 and a detection unit 40.

The self-machine position detection module 18, as described hereinbefore, detects the self-machine position of the combine 10. The self-machine position detected by the self-machine position detection module 18 is transmitted or communicated as "self-machine position information", to the map creation section 30 and the operational mode setting section 32 which will be described later.

The map creation section 30 creates, based on the self-machine position, a map indicative of a position of a reaped land of the field in which crop have been reaped and a position of an un-reaped land of the field in which crops have not yet been reaped. The self-machine position is transmitted as the self-machine position information from the self-machine position detection module 18. In the above, the reaped land of the field in which crops have been reaped means an area within the field where crops have been reaped, and this area corresponds to the outer circumference area SA in the example shown in FIG. 2. The un-reaped land means an area within the field where crops have not yet been reaped, and this area corresponds to the work subject area CA in the example shown in FIG. 2.

As described above, when the driver/operator has caused the combine 10 to travel by a manual operation, the self-machine position detection module 18 acquires the self-machine positions and the map creation section 30 sets an outer shape or contour of the field based on the acquired self-machine positions. This outer shape becomes the basis for the creation of the map of the field. Further, the self-machine position detection module 18 will detect the self-machine positions also while the combine 10 is harvesting the crops at the time of the manual operation. The self-machine positions acquired this time will be set for the reaped land on the map. Upon setting of the outer circumference area SA, the combine 10 will effect automated traveling in the work subject area CA. In the course of this, the map will be created with switching (updating) the area where crops have been reaped from the un-reaped land to the reaped land. It is possible to arrange such that the map created by the map creation section 30 is stored within this map creation section 30 or may be stored in a storage section provided separately.

The machine body work information acquiring section 31 acquires machine body work information indicative of machine works to be carried out by the machine body 11 (an example of the "machine body" or "vehicle body"). Here, the term "machine body work information means information indicative of whether the combine 10 is currently engaged in a harvesting work or not and information indicative of mode of traveling of the combine 10. This latter information indicative of a traveling mode of the combine 10 means information indicative of whether the traveling mode is straight traveling or turning traveling. In the instant embodiment, the machine body works include a straight traveling harvesting work in which crops are harvested while the machine body 11 is caused to travel straight, a turning harvesting work in which crops are harvested while the machine body 11 is caused to turn, and a turning traveling in which the machine body 11 is turned while harvesting of crops is suspended.

The machine body work information acquiring section 31 acquires machine body work information indicative of such machine works by calculating them from operational states of the respective functional sections of the combine 10. The machine body work information acquired by the machine body work information acquiring section 31 is transmitted to the operational mode setting section 32 which will be described later.

The detection unit 40 is provided in the machine body 11 and constituted of a plurality of detection modules capable of detecting conditions of the surrounding of the machine body 11. In the instant embodiment, the detection unit 40 is constituted of four ultrasonic sensors. Specifically, the detection unit 40 includes a front side detection module 41 disposed at a front center portion of the machine body 11 and capable of detecting a condition of the front side of the machine body 11, a rear side detection module 42 disposed at a rear center portion of the machine body 11 and capable of detecting a condition of the rear side of the machine body 11, a left side detection module 43 disposed at a left side portion of the machine body 11 and capable of detecting a condition of the left side of the machine body 11 and a right side detection module 44 disposed at a right side portion of the machine body 11 and capable of detecting a condition of the right side of the machine body 11.

The operational mode setting section 32 sets operational modes respectively of the plurality of detection modules 41-44, based on the map and the self-machine position. The map is created by the map creation section 30. The self-machine position is detected by the self-machine position detection module 18 and transmitted as self-machine position information.

In the above, the operational modes respectively of the plurality of detection modules 41-44 indicate operational states of the plurality of detection modules 41-44, respectively. The operational states correspond to a detection state for effecting detection, a stopped state not effecting any detection, a wide range detection state for effecting detection of a detection range wider than a predetermined range, a narrow range detection state for effecting detection of a detection range narrower equal to or narrower than the predetermined range, a high sensitivity state in which the detection sensitivity is set higher than a predetermined value, a low sensitivity state in which the detection sensitivity is set equal to or lower than the predetermined value, and so on. In the instant embodiment, the operational mode setting section 32 is able to set such operational modes for the respective detection modules 41-44.

The operational mode setting section 32 stops the detection function of a particular detection module among the plurality of detection modules 41-44, which particular detection module is directed to detection of an un-reaped land of interest, based on the map and the self-machine position. As described above, in this embodiment, the front side detection module 41 can detect a condition of the front side of the machine body 11, and the rear side detection module 42 can detect a condition of the rear side of the machine body 11. Further, the left side detection module 43 can detect a condition of the left side of the machine body 11, and the right side detection module 44 can detect a condition of the right side of the machine body 11.

Figure 5:
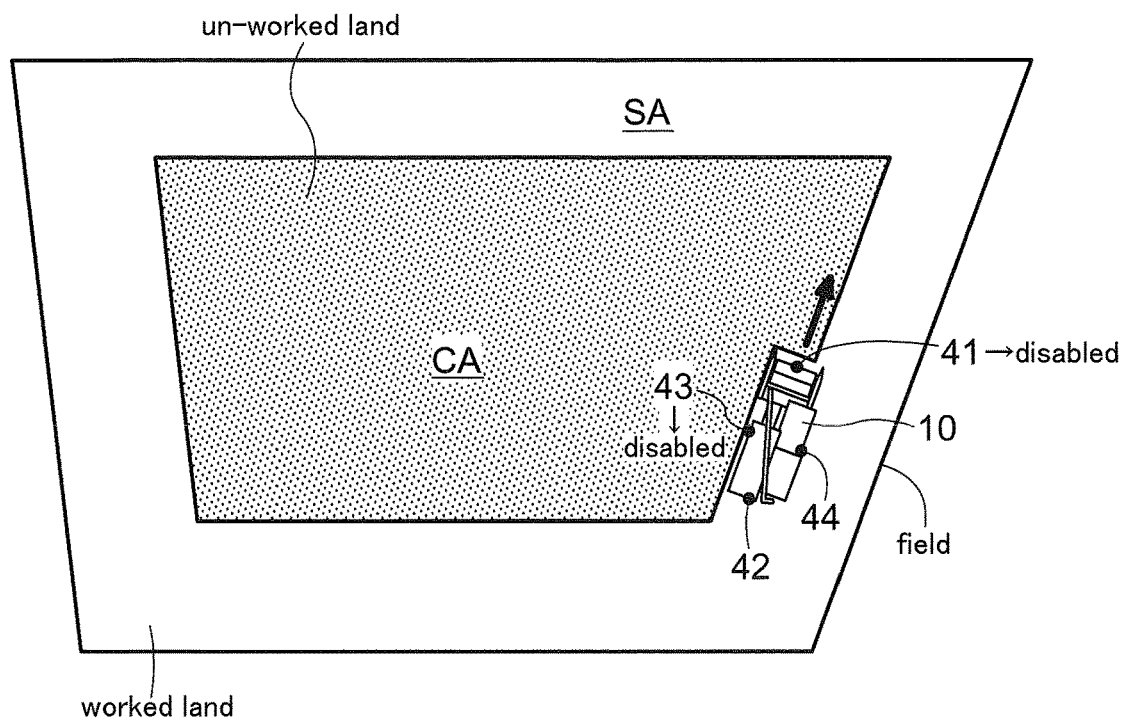
FIG. 5 is a view showing an example setting of an operational mode.

When a reaping work of the outer circumference area SA of the field has been completed and a reaping work for the work subject area CA located on the inner side thereof is now to be carried out, an un-reaped land and a reaped land may be present in a mixed state in the circumference of the combine 10. Specifically, as shown in FIG. 5 for instance, it may be that the front side and one of the left and right opposed sides (the left side in the example shown in FIG. 5) of the combine 10 are un-reaped lands (un-worked lands) whereas the rear side and the other one of the left and right opposed sides (the right side in the example shown in FIG. 5) are reaped (worked) lands. In such case, the operational mode setting section 32 stops (disables) the detection functions of the front side detection module 41 and the left aide detection module 43 which are directed to condition detection of un-reaped (un-worked) lands and allows (enables) the detection functions of the rear side detection module 42 and the right side detection module 44 which are directed to condition detection of reaped (worked) lands. Here, disabling a detection function means not using detection of the detection module. As a specific method to do this, for instance, an arrangement may be provided such that the detection function of the detection module of interest is not to be outputted or that the detection result of the detection module is not to be utilized by the respective functional section.

Further, it is also possible to configure the operational mode setting section 32 to set the detection sensitivity for a reaped land present on the lateral side of the machine body 11 higher than that for a reaped land present on the rear side of the machine body 11, during traveling in an un-reaped land in the field. When the combine 10 is traveling in a field while carrying out a reaping work therein, a reaped land will be formed on the rear side of the combine 10. In this, the combine 10 travels away from the rear area. On the other hand, on the lateral side of the combine 10, in many cases, a reaped land where reaping work has been completed will be formed. Then, advantageously, the operational mode setting section 32 sets the detection sensitivity of the detection modules disposed on the lateral sides (the left side detection module 43 and the right side detection module 44) higher than the detection sensitivity of the rear side detection module 42.

Further, it is also possible to configure the operational mode setting section 32 to set the detection sensitivity for a reaped land present on the front side of the machine body 11 higher than the detection sensitivity for a reaped land present on the lateral side of the machine body 11, during traveling in a reaped land in a field. One conceivable case of such traveling of the combine 10 in a reaped land is a case when the combine 10 is traveling toward the transporter vehicle CV at the time of discharging of grains onto this transporter vehicle CV. Then, in such case, the traveling speed may be higher than during a harvesting work. Then, advantageously, the operational mode setting section 32 will set the detection sensitivity of the front side detection module 41 higher than the detection sensitivity of the lateral side detection module (the left side detection module 43 and the right side detection module 44).

Figure 6:
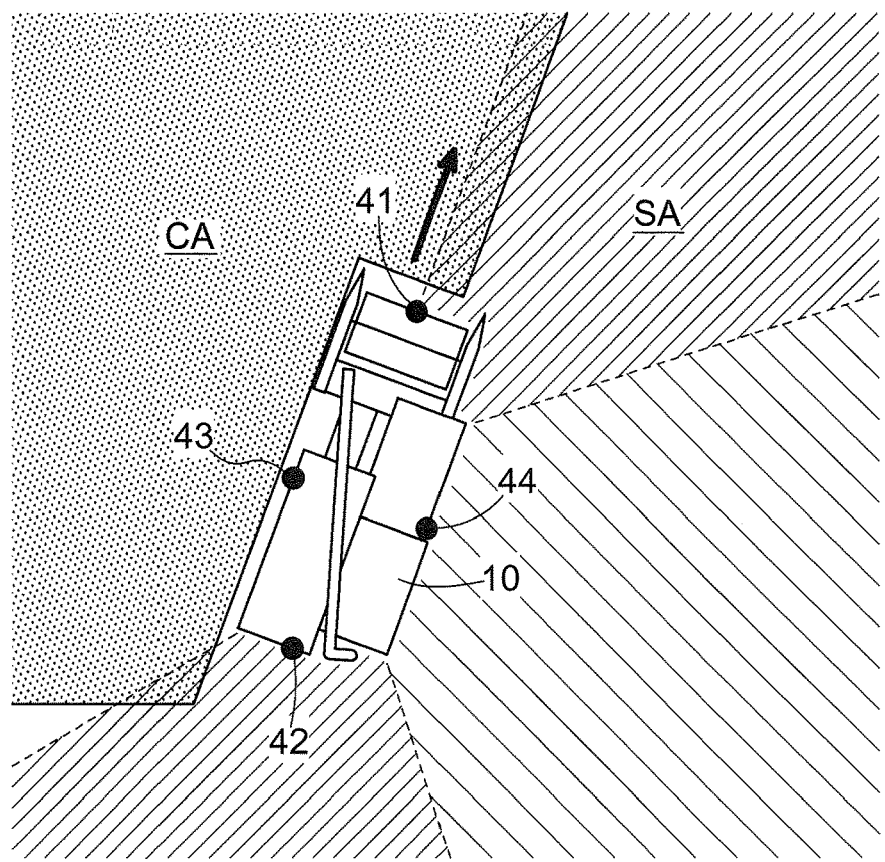
FIG. 6 is a view showing an example setting of the operational mode.

Moreover, the operational mode setting section 32 may alternatively be configured to set the detection ranges of the plurality of detection modules 41-44, based on the map and the self-machine position. For instance, in the exemplary case shown in FIG. 5, in an area located on the left front side of the combine 10, this can be detected by both the front side detection module 41 and the right side detection module 44. However, since a reaped land is present to extend on the right side of the combine 10, if the detection range of the right side detection module 44 is wide, the load (calculation load relating to the detection) will be significant. Then, advantageously, as shown in FIG. 6, the operational mode setting section 32 may set the respective detection ranges such that the area located on the right front side of the combine 10 may be covered by the front side detection module 41 and the right side detection module 44 in distribution whereas the area located on the right rear side of the combine 10 may be covered by the rear side detection module 42 and the right side detection module 44 in distribution. With this arrangement, it becomes possible to prevent detection delay and detection error.

Moreover, the operational mode setting section 32 may be configured to set the detection range of the detection module (s) directed to detection of a condition of a reaped land, in accordance with e.g. a traveling distance (non-working traveling distance) after detection of an object by the detection module until subsequent stop of the combine 10.

Figure 7:
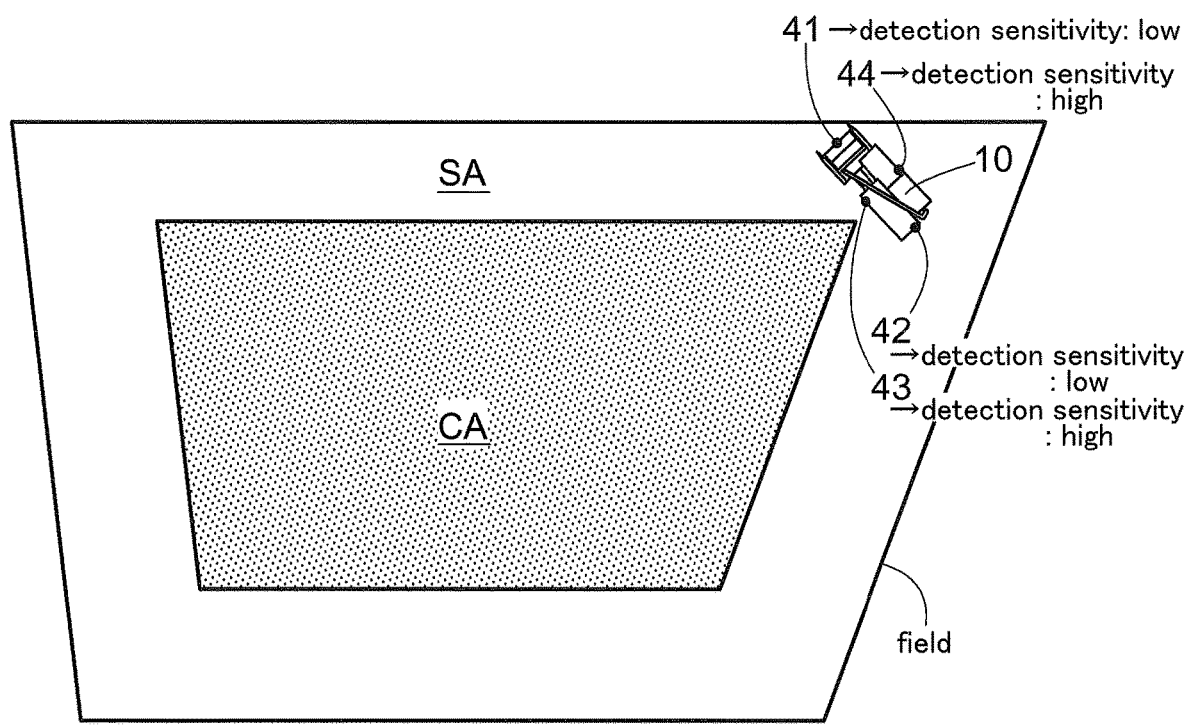
FIG. 7 is a view showing an example setting of the operational mode.

Further advantageously, the operational mode setting section 32 may be configured to set the detection sensitivity for the lateral sides of the machine body 11 higher than those for the front side and the rear side in the advancing direction of the machine body 11, during the turning harvesting work and the turning traveling. The turning harvesting work means a work in which crops are harvested while the machine body 11 is caused to turn. The turning traveling means traveling in which the machine body 11 is caused to turn while harvesting of crops is suspended. During such turning harvesting work and the turning traveling (for instance, the situation illustrated in FIG. 7), in order to prevent erroneous entrapment of an object present on the inner side of the turning of the combine 10 as well as accidental contact with an object present at an outer terminal end of foregoing turn in particular, advantageously, the detection sensitivities of the left side detection module 43 and the right side detection module 44 may be set higher than the detection sensitivities of the front side detection module 41 and the rear side detection module 42.

Other Embodiments

In the foregoing embodiment, it was explained that based on the self-machine position and the map, the operational mode setting section 32 stops the detection function of the detection module directed to detection of a condition of an un-reaped (un-worked) land, selectively among the plurality of detection modules. However, at the time of forward traveling reaping, the detection may be switched to the front side detection module 41; at the time of reverse traveling, the detection may be switched to the rear detection module 42; at the time of left turning, the detection may be switched to the left side detection module 43; and at the time of right turning, the detection may be switched to the right side detection module 44, respectively. Further alternatively, the four detection modules 41-44 may be switched over among them for detection of interest, cyclically, to carry out conditions monitoring (obstacle detection).

In the foregoing embodiment, it was explained that the detection modules were constituted with using ultrasonic sensors. However, the detection modules may be cameras. In this case, at the time of forward traveling harvesting, the detection may be switched to a front side camera; at the time of reverse traveling, the detection may be switched to a rear side camera; and at the time of turning, the detection may be switched to a turning direction side camera, respectively. With this, erroneous detection can be prevented and the calculation load for detection result can be reduced. Further alternatively, four cameras may be cyclically switched over for detection to effect surrounding monitoring (obstacle detection). Still further alternatively, a bird's eye view (a surround view) may be created with using four cameras, for facilitating the worker's viewing of the surrounding conditions.

Moreover, in the case of constituting the detection modules by cameras, instead of using the four cameras as described above, it is possible to employ an all-around view camera capable of capturing an image of the combine 10 for the entire circumference of the combine 10 or a so-called spherical camera (360 degree camera) capable of omnidirectional panoramic photographing in all of the upper, lower and left and right directions of the combine 10. In case such cameras as above are employed, the above-described advantageous effect can be achieved by setting in image(s) captured by the camera(s) an area to be used and an area not to be used by the operational mode setting section 32.

Furthermore, the detection modules may be laser sensors or distance (range) sensors. In either case, as the operational mode setting section 32 sets an operational mode in accordance with a work state of the combine 10, detection suitable for a particular work state of the combine 10 will be made possible.

Also, it is possible to arrange such that the detection modules detect abnormality of the machine body 11 of the combine 10. In this case, advantageously, the detection modules will be constituted of cameras to capture images of the machine body 11. With this, detection of abnormality of the machine body 11 is made possible. Further, the detection modules may be constituted of using microphones also. In this case, by analyzing the sounds (e.g. frequency analysis, etc.) collected by the microphones, it is possible to detect abnormality in the engine or abnormality (clogging etc.) in the grain discharging device 17, etc. Incidentally, such detection by way of sounds is possible by carrying out a machine learning in advance and then making comparison with the sound obtained by the machine learning. With this, there is no necessity of provide any special sensor separately and it is also possible to reduce the number of sensors to be employed, so that abnormality detection of the combine 10 can be provided economically.

In the foregoing embodiment, the explanation was made with citing the combine 10 as an example of "harvester". However, the invention is applicable also to any other harvester than the combine 10, such as a cone harvester, etc.

In the foregoing embodiment, there were explained a harvester configured to harvest crops while traveling in a field as well as a detection system configured to detect condition of the surrounding of the harvester configured to harvest crops while traveling in a field. In addition, it is also possible to configure a surrounding condition detection program causing a computer to execute the respective functional sections in the foregoing embodiment. In this case, the surrounding situation detection program may be configured to cause the computer to execute a self-machine position detection function causing a self-machine position detection module to detect a self-machine position of the harvester, a detection function causing a detection unit including a plurality of detection modules to detect conditions of surrounding of the harvester, a map creation function creating, based on the self-machine position, a map indicative of a position of a reaped land in the field where the crops have been reaped and a position of an un-reaped land in the field where the crops have not yet been reaped, and an operational mode setting function setting operational modes of the plurality of detection modules respectively, based on the map and the self-machine position.

Further, such surrounding condition detection program may be configured to be recorded in a recording medium.

Moreover, for the surrounding condition detection program and the surrounding condition detection program recorded in a recording medium, the operational mode setting function may be configured to stop a detection function of a particular detection module among the plurality of detection modules, based on the map and the self-machine position, the particular detection module being assigned for detection of the conditions of the un-reaped land. Further, the operational mode setting function may be configured to set detection ranges of the plurality of detection modules, based on the map and the self-machine position. Also, machine body works effected by the machine body of the harvester may include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn. Further, the operational mode setting function may be configured to set higher detection sensitivity for the lateral sides of the machine body than for the front side and the rear side with respect to the advancing direction of the machine body, during the turning harvesting work and the turning traveling. Moreover, the operational mode setting function may be configured to set higher detection sensitivity for the reaped land present laterally of the machine body than for the reaped land present rearwardly of the machine body, during traveling in the un-reaped land in the field or set higher detection sensitivity for the reaped land located forwardly of the machine body than the reaped land located laterally of the machine body, during traveling in the reaped land in the field.

Further, the operations effected by the respective functional sections in the foregoing embodiment may be configured as a surrounding condition detection method for a harvester configured to harvest crops while traveling in a field. In this case, the surrounding condition detection method may comprise a self-machine position detection step causing a self-machine position detection module to detect a self-machine position of the harvester, a detection step causing a detection unit including a plurality of detection modules to detect conditions of surrounding of the harvester, a map creation step creating, based on the self-machine position, a map indicative of a position of a reaped land in the field where the crops have been reaped and a position of an un-reaped land in the field where the crops have not yet been reaped, and an operational mode setting step setting operational modes of the plurality of detection modules respectively, based on the map and the self-machine position.

In the above-described surrounding condition detection method too, the operational mode setting step may be configured to stop a detection function of a particular detection module among the plurality of detection modules, based on the map and the self-machine position, the particular detection module being assigned for detection of the conditions of the un-reaped land. Or, the operational mode setting step may be configured to set detection ranges of the plurality of detection modules, based on the map and the self-machine position. Further, the machine body works effected by the machine body of the harvester may include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn. Further, the operational mode setting step may be configured to set higher detection sensitivity for the lateral sides of the machine body than for the front side and the rear side with respect to the advancing direction of the machine body, during the turning harvesting work and the turning traveling. Moreover, the operational mode setting step may be configured to set higher detection sensitivity for the reaped land present laterally of the machine body than for the reaped land present rearwardly of the machine body, during traveling in the un-reaped land in the field or set higher detection sensitivity for the reaped land located forwardly of the machine body than the reaped land located laterally of the machine body, during traveling in the reaped land in the field.

INDUSTRIAL APPLICABILITY

The present invention can be used for detection of condition of the surrounding of a harvester configured to harvest crops while traveling in a field.

DESCRIPTION OF REFERENCE SIGNS

1: detection system (surrounding condition detection system)
10: combine (harvester)
11: vehicle body (machine body)
18: self-machine position detection module
30: map creation section
32: operational mode setting section
40: detection unit
41-44: detection modules

The invention claimed is:

1. A harvester configured to harvest crops while traveling in a field, comprising a detection system; and a detection unit,
wherein the detection system further comprises at least one computer configured to execute:
a self-machine position detection function operable to detect a self-machine position;
a map creation function operable to create, based on the self-machine position, a map indicative of a position of a reaped land in the field where the crops have been reaped and a position of an un-reaped land in the field where the crops have not yet been reaped; and
an operational mode setting function for setting operational modes of a plurality of detection modules respectively, based on the map and the self-machine position,
wherein the detection unit further comprises:
the plurality of detection modules capable of detecting condition of surrounding of a machine body of the harvester, wherein the detection unit is included in the machine body,
wherein the operational mode setting function is configured to distinguish between a particular detection module being directed to detection of the condition of the un-reaped land and a particular detection module being directed to detection of the condition of the reaped land among the plurality of detection modules,
wherein the operational mode setting function causes a detection function of the particular detection module being directed to detection of the condition of the un-reaped land to stop in response to a presence of the un-reaped land determined based on the map and the self-machine position, while allowing a detection function of the particular detection module being directed to detection of the condition of the reaped land in response to a presence of the reaped land determined based on the map and the self-machine position, and
wherein, after the detection function of the particular detection module being directed to detection of the condition of the un-reaped land is stopped, the operational mode setting function causes the harvester to continue traveling in the field.

2. The harvester of claim 1, wherein the operational mode setting section is configured to set detection ranges of the plurality of detection modules, based on the map and the self-machine position.

3. The harvester of claim 1, wherein:
machine body operations controlled by the machine body include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and
at a time of the turning harvesting work and at a time of the turning traveling, the operational mode setting function sets higher detection sensitivity for the lateral sides of the machine body than those for the front side and the rear side with respect to an advancing direction of the machine body.

4. The harvester of claim 1, wherein:
at a time of traveling in the reaped land in the field, the operational mode function section sets higher sensitivity for the reaped land located laterally of the machine body than for the reaped land located rearwardly of the machine body; and
at a time of traveling in the reaped land in the field, the operational mode setting function sets higher sensitivit for the reaped land located forwardly of the machine body than for the reaped land located laterally of the machine body.

5. A surrounding condition detection system for a harvester configured to harvest crops while traveling in a field, the system comprising a detection system and a detection unit,
wherein the detection system further comprises at least one computer configured to execute:
a self-machine position detection function operable to detect a self-machine position of the harvester;
a map creation section operable to create, based on the self-machine position, a map indicative of a position of a reaped land in the field where the crops have been reaped and a position of an un-reaped land in the field where the crops have not yet been reaped; and
an operational mode setting section for setting operational modes of a plurality of detection modules respectively, based on the map and the self-machine position,
wherein the detection unit further comprises:
the plurality of detection modules capable of detecting conditions of surrounding of the harvester, wherein the detection unit is included in a machine body of the harvester, and
wherein the operational mode setting function is configured to distinguish between a particular detection module being assigned for detection of the conditions of the un-reaped land and a particular detection module being assigned for detection of the conditions of the reaped land among the plurality of detection modules,
wherein the operational mode setting function causes a detection function of the particular detection module being assigned for detection of the conditions of the un-reaped land to stop in response to a presence of the un-reaped land determined based on the map and the self-machine position, while allowing a detection function of the particular detection module being assigned for detection of the conditions of the reaped land in response to a presence of the reaped land determined based on the map and the self-machine position, and
wherein, after the detection function of the particular detection module being directed to detection of the condition of the un-reaped land is stopped, the operational mode setting function causes the harvester to continue traveling in the field.

6. The surrounding condition detection system of claim 5, wherein the operational mode setting section is configured to set detection ranges of the plurality of detection modules, based on the map and the self-machine position.

7. The surrounding condition detection system of claim 5, wherein:
- machine body operations controlled by the machine body of the harvester include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and
- at a time of the turning harvesting work and at a time of the turning traveling, the operational mode setting function sets higher detection sensitivity for the lateral sides of the machine body than those for a front side and a rear side with respect to an advancing direction of the machine body.

8. The surrounding condition detection system of claim 5, wherein:
- at a time of traveling in the un-reaped land in the field, the operational mode setting function sets higher sensitivity for the reaped land located laterally of the machine body than for the reaped land located rearwardly of the machine body; and
- at a time of traveling in the reaped land in the field, the operational mode setting function sets higher sensitivity for the reaped land located forwardly of the machine body than for the reaped land located laterally of the machine body.

9. A surrounding condition detection method for a harvester comprising a detection system and a detection unit, wherein the detection system comprises at least one computer configured to execute a self-machine position detection function, a map creation function, and an operational mode setting function wherein the detection unit comprises a plurality of detection modules, the harvester configured to harvest crops while traveling in a field, the method comprising:
- a self-machine position detection step causing a self-machine position detection function to detect a self-machine position of the harvester;
- a detection step causing a detection unit to detect conditions of surrounding of the harvester;
- a map creation step creating, based on the self-machine position, a map indicative of a position of a reaped land in the field where the crops have been reaped and a position of an un-reaped land in the field where the crops have not yet been reaped; and
- an operational mode setting step setting operational modes of the plurality of detection modules respectively, based on the map and the self-machine position,
- wherein the operational mode setting step is configured to distinguist between a particular detection module being assigned for detection of the conditions of the un-reaped land and a particular detection module being assigned for detection of the conditions of the reaped land among the plurality of detection modules,
- wherein the operational mode setting function causes a detection function of the particular detection module being assigned for detection of the conditions of the un-reaped land to stop in response to a presence of the un-reaped land determined based on the map and the self-machine position while allowing a detection function of the particular detection module being assigned for detection of the conditions of the reaped land in response to a presence of the reaped land determined based on the map and the self-machine position, and
- wherein, after the detection function of the particular detection module being directed to detection of the condition of the un-reaped land is stopped, the operational mode setting function causes the harvester to continue travel in the field.

10. The surrounding condition detection method of claim 9, wherein the operational mode setting step is configured to set detection ranges of the plurality of detection modules, based on the map and the self-machine position.

11. The surrounding condition detection method of claim 9, wherein:
- machine body operations controlled by the machine body of the harvester include a straight traveling harvesting work in which the crops are harvested while the machine body is caused to travel straight, a turning harvesting work in which the crops are harvested while the machine body is caused to turn, and a turning traveling in which harvesting of the crops is suspended and the machine body is caused to turn; and
- at a time of the turning harvesting work and at a time of the turning traveling, the operational mode setting step sets higher detection sensitivity for the lateral sides of the machine body than those for the front side and the rear side with respect to an advancing direction of the machine body.

12. The surrounding condition detection method of claim 9, wherein:
- at a time of traveling in the un-reaped land in the field, the operational mode setting step sets higher sensitivity for the reaped land located laterally of the machine body than for the reaped land located rearwardly of the machine body; and
- at a time of traveling in the reaped land in the field, the operational mode setting step sets higher sensitivity for the reaped land located forwardly of the machine body than for the reaped land located laterally of the machine body.

* * * * *

UNITED STATES PATENT AND TRADEMARK OFFICE
CERTIFICATE OF CORRECTION

PATENT NO. : 12,324,370 B2
APPLICATION NO. : 17/269747
DATED : June 10, 2025
INVENTOR(S) : Takashi Nakabayashi It is certified that error appears in the above-identified patent and that said Letters Patent is hereby corrected as shown below:

In the Claims

Column 17, Line 58, Claim 2, delete "section" and insert -- function --

Column 17, Line 62, Claim 3, delete "machine" and insert -- the machine --

Column 18, Line 5, Claim 3, delete "the lateral" and insert -- lateral --

Column 18, Line 6, Claim 3, delete "the" and insert -- a --

Column 18, Line 7, Claim 3, delete "the" and insert -- a --

Column 18, Line 10, Claim 4, delete "reaped" and insert -- un-reaped --

Column 18, Line 16, Claim 4, delete "sensitivit" and insert -- sensitivity --

Column 18, Line 28, Claim 5, delete "section" and insert -- function --

Column 18, Line 34, Claim 5, delete "section" and insert -- function --

Column 18, Line 65, Claim 6, delete "section" and insert -- function --

Column 19, Line 3, Claim 7, delete "machine" and insert -- the machine --

Column 19, Line 13, Claim 7, delete "the lateral" and insert -- lateral --

Column 19, Line 34, Claim 9, delete "function" and insert -- function, --

Column 19, Line 38, Claim 9, delete "a" and insert -- the --

Signed and Sealed this
Nineteenth Day of August, 2025

Coke Morgan Stewart
*Acting Director of the United States Patent and Trademark Office*

CERTIFICATE OF CORRECTION (continued)
U.S. Pat. No. 12,324,370 B2

Column 19, Line 41, Claim 9, delete "a" and insert -- the --

Column 19, Line 52, Claim 9, delete "distinguist" and insert -- distinguish --

Column 20, Line 26, Claim 11, delete "machine" and insert -- the machine --

Column 20, Line 36, Claim 11, delete "the lateral" and insert -- lateral --

Column 20, Line 37, Claim 11, delete "the" and insert -- a --

Column 20, Line 37, Claim 11, delete "the" and insert -- a --